(12) United States Patent
Schmitt et al.

(10) Patent No.: US 7,793,554 B2
(45) Date of Patent: Sep. 14, 2010

(54) FLEXIBLE SENSOR FLOW AND TEMPERATURE DETECTOR

(75) Inventors: Randall Paul Schmitt, Clinton Township, MI (US); Jeffrey John Belz, Eastpointe, MI (US)

(73) Assignee: Masco Corporation, Taylor, MI (US)

( * ) Notice: Subject to any disclaimer, the term of this patent is extended or adjusted under 35 U.S.C. 154(b) by 28 days.

(21) Appl. No.: 12/366,368

(22) Filed: Feb. 5, 2009

(65) Prior Publication Data

US 2010/0192701 A1 Aug. 5, 2010

(51) Int. Cl.
*G01F 1/32* (2006.01)
(52) U.S. Cl. .................................. 73/861.24
(58) Field of Classification Search .............. 73/861.24, 73/861.22, 861.19, 861.21
See application file for complete search history.

(56) References Cited

U.S. PATENT DOCUMENTS

| | | | |
|---|---|---|---|
| 3,213,440 A | 10/1965 | Gesteland et al. | |
| 3,683,691 A | 8/1972 | Kivenson | |
| 3,698,245 A | 10/1972 | McNabb | |
| 3,788,141 A | 1/1974 | Blackwell | |
| 3,804,210 A | 4/1974 | Erickson | |
| 3,972,232 A | 8/1976 | Miller et al. | |
| 4,085,614 A | 4/1978 | Curran et al. | |
| 4,487,076 A | 12/1984 | Burlage et al. | |
| 4,497,203 A | 2/1985 | Wada | |
| 4,520,678 A | 6/1985 | Koziol et al. | |
| 4,926,532 A | 5/1990 | Phipps et al. | |
| 5,209,125 A | 5/1993 | Kalinoski et al. | |
| 5,463,904 A | 11/1995 | Kalinoski | |
| 5,576,684 A | 11/1996 | Langford | |
| 5,583,476 A | 12/1996 | Langford | |
| 5,789,827 A | 8/1998 | Rowley et al. | |
| 6,298,734 B1 * | 10/2001 | Storer et al. | 73/861.22 |
| 6,347,911 B1 | 2/2002 | Blair et al. | |
| 6,497,430 B1 | 12/2002 | Odom et al. | |
| 7,248,142 B2 | 7/2007 | Beck et al. | |
| 7,277,004 B2 | 10/2007 | Beck et al. | |
| 2002/0104530 A1 | 8/2002 | Ivri et al. | |
| 2004/0011723 A1 | 1/2004 | Bradford et al. | |
| 2004/0107778 A1 | 6/2004 | Berberig | |

FOREIGN PATENT DOCUMENTS

| | | |
|---|---|---|
| EP | 0089415 | 9/1983 |
| EP | 0666468 | 8/1995 |
| JP | 52071283 | 6/1977 |
| JP | 54079068 | 6/1979 |
| JP | 54121780 | 9/1979 |
| JP | 57052820 | 3/1982 |
| JP | 62019716 | 1/1987 |

OTHER PUBLICATIONS

Flexpoint Flexible Sensor Systems, Bend Sensor® Technolgy Mechanical Application Design Guide, 1997, 10 pgs.
Flexpoint Flexible Sensor Systems, The thin, flexible Bend Sensor® from Flexpoint offers limitless possibilities, downloaded from webside, dated 2005, 2 pgs.

* cited by examiner

*Primary Examiner*—Jewel Thompson
(74) *Attorney, Agent, or Firm*—Baker & Daniels LLP

(57) ABSTRACT

Methods and apparatuses for detecting the flow volume of a fluid using alternating vortices.

16 Claims, 4 Drawing Sheets

FLEXIBLE SENSOR FLOW AND TEMPERATURE DETECTOR

BACKGROUND AND SUMMARY OF THE INVENTION

The present invention relates generally to flexible sensors and, more particularly, to a flexible sensor for measuring flow and temperature through detection of vortex shedding i.e., von Kármán vortex street.

Vortex frequency flow meters utilize the periodic vortex shedding of a blunt obstruction i.e., a bluff body located in the fluid and flow. The phenomenon exists that vortices are shedded in alternating opposing sides of the blunt obstruction or bluff body. Therefore, a so-called von Kármán vortex street is created by the vortices. The vortices remain active for a certain distance behind the obstruction in the flow before being dissolved due to viscosity. For certain obstructions there exists a relationship between the frequency of vortex shedding and the speed of fluid flow. In other words, the speed of fluid flow can be directly derived from determining the frequency of vortex shedding. Vortex sensors used for determining vortex sheddings may be used to identify other parameters of the flowing fluid.

Numerous methods and apparatuses have been designed for measuring vortex streets in order to determine the flow of fluid through piping. One apparatus is a thermal sensor i.e., hot wire. Thermal sensors measure cooling rates resulting from the passage of vortices across the bluff body and the sensor. Another apparatus implements a magnetic pick-up disk or shuttle-type sensing element which detects vibrations of the disk or shuttle element based on the pressure pulses of the vortex street. Several vortex sensors implement piezo electric crystals or piezo resistant systems as has been described in great detail by several references. Each of these systems has its own limitations, advantages, and disadvantages.

According to an illustrative embodiment, the present disclosure provides a vortex sensor for detecting the flow volume of a fluid. The vortex sensor includes a housing defining a housing cavity for the fluid to flow. The vortex sensor includes an obstruction supported by the housing. The obstruction is mounted in the housing cavity. The obstruction is perpendicular to the flow of the fluid. The obstruction includes a plurality of side edges configured to generate alternating vortices in the fluid. The vortex sensor includes a flexible deflection sensor supported by the obstruction. The flexible deflection sensor has a longitudinal axis downstream of the obstruction. The flexible deflection sensor is configured to be located between the alternating vortices in the fluid. The flexible deflection sensor includes a flexible insulating substrate and a conductive material applied to the flexible insulating substrate. The conductive material has an electrical resistance which varies as the conductive material is bent.

According to a further illustrative embodiment, the present disclosure includes a vortex sensor for detecting the flow volume of a fluid and for detecting the temperature of the fluid. The vortex sensor includes a housing defining a housing cavity for the fluid to flow. The vortex sensor includes an obstruction supported by the housing. The obstruction is mounted in the housing cavity. The obstruction is perpendicular to the flow of the fluid. The obstruction includes a plurality of side edges configured to generate alternating vortices in the fluid. The vortex sensor includes a flexible deflection sensor supported by the obstruction. The flexible deflection sensor has a longitudinal axis downstream of the obstruction. The flexible deflection sensor is configured to be located between the alternating vortices in the fluid. The flexible deflection sensor includes a flexible insulating substrate having a glass transition temperature generally below a range of approximate temperatures of the fluid. The flexible insulating substrate includes a linear material. The flexible deflection sensor includes a conductive material applied to the flexible insulating substrate. The conductive material has an electrical resistance which varies as the conductive material is bent.

According to a further illustrative embodiment, the present disclosure includes a method of detecting the flow volume of a fluid. The method comprises the step of providing a flexible deflection sensor supported by an obstruction. The flexible deflection sensor and the obstruction are mounted within a housing cavity defined by a housing. The flexible deflection sensor is located downstream of the obstruction. The flexible deflection sensor includes a conductive material having an electrical resistance which varies with an amount of bending of the conductive material. The method comprises the step of providing the flow of the fluid through the housing cavity. The method comprises the step of generating alternating vortices in the fluid. The method comprises the step of applying an electrical signal to the conductive material. The method comprises the step of measuring variation in the electrical resistance. The method comprises the step of analyzing the frequency of the variation to determine the flow volume of the fluid.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The above mentioned and other features and objects of this disclosure, and the manner of attaining them, will become more apparent and the invention itself will be better understood by reference to the following description of an embodiment of the disclosure taken in conjunction with the accompanying drawings, wherein.

Figure 1:
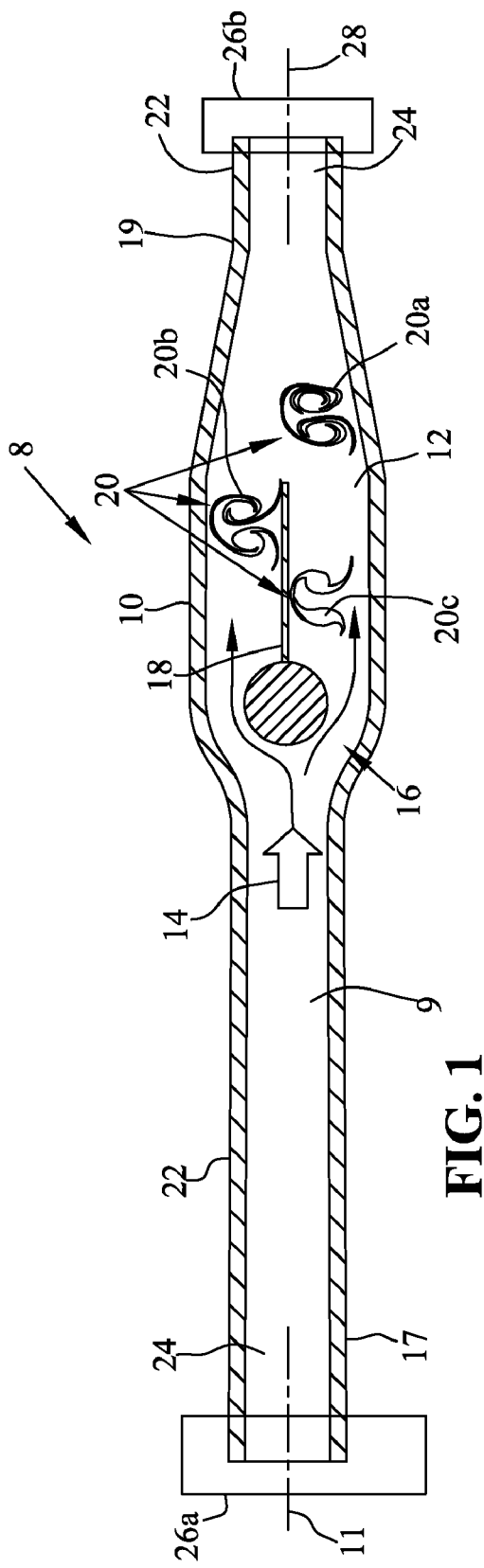
FIG. 1 is a cross sectional view of the housing, the obstruction, and the flexible deflection sensor according to an illustrative embodiment of the present disclosure.

Corresponding reference characters indicated corresponding parts throughout the several views. Although the drawings represent embodiments of the present disclosure, the drawings are not necessarily to scale and certain features may be exaggerated in order to better illustrate and explain the present disclosure. Although the exemplification set out herein illustrates embodiments of the disclosure, in several forms, the embodiments disclosed below are not intended to be exhaustive or to be construed as limiting the scope of the disclosure to the precise forms disclosed.

DETAILED DESCRIPTION OF THE DRAWINGS

The embodiments hereinafter disclosed are not intended to be exhaustive or limit the invention to the precise forms disclosed in the following description. Rather the embodiments are chosen and described so that others skilled in the art may utilize its teachings.

Referring initially to FIG. 1, an illustrative vortex sensing system 8 is shown as including a housing 10, an obstruction 16, and a flexible deflection sensor or membrane 18 according to an illustrative embodiment of the present disclosure. Housing 10 is illustrated as a section of pipe, tube, or other fluid conduit extending substantially parallel to a longitudinal axis 11. Housing 10 is adapted for insertion into a fluid line where fluid 9 flows through housing 10. Housing 10 defines a housing cavity 12 through which fluid 9 flows, as shown by direction arrow 14 in FIG. 1. In this Figure, the left side of housing 10 is illustrated as upstream or the upstream end 17, while the right side or right end of housing 10 is illustrated as downstream or the downstream end 19. Housing 10 is shown as defining a generally cylindrical shape. It is also envisioned that housing 10 can define other shapes in cross section, such as a polygon or oval. Housing 10 may also include at least one sleeve 22, such as a polymeric liner received within the housing cavity 12. Sleeve 22 may conform to the shape of the housing cavity 12, thereby defining a generally cylindrical shape or any shape of housing 10. Sleeve 22 illustratively includes a sleeve cavity 24 having a diameter less than housing cavity 12. Furthermore, housing 10 may include inlet and outlet end connectors 26a and 26b, respectively, configured to couple housing 10 to typical conduit couplings, such as threaded members.

As illustrated in FIG. 1, obstruction 16 is located within housing cavity 12, and is therefore within the flow of fluid 9. As also illustrated in FIG. 1, obstruction 16 is shown as perpendicular to the flow of fluid 9. Obstruction 16 (also known as vortex generating body 16) is configured to generate alternating vortices 20 in the fluid 9, as generally described by the phenomenon known as vortex shedding (also known as von Kármán vortex streets).

As illustrated in FIG. 1, obstruction 16 may be substantially spherical, thereby defining a generally cylindrical cross section in planes parallel with and perpendicular to the fluid flow 14. However, it is understood by one of ordinary skill in the art that obstruction 16 can take a plurality of cross sectional shapes as are commonly understood to generate vortex shedding. For example, an alternative obstruction shape is a obstruction ring structure, as defined in greater detail in U.S. Published Patent Application 2004/0107778 to Berberig, which is incorporated by reference herein. Another alternative obstruction shape may be a prism.

Obstruction 16 may also include a plate or include a flat surface facing upstream. Facing upstream is defined as towards the flow of fluid 9 or towards the upstream end 17 of housing 10. The front surface may have a longitudinal axis that is perpendicular to the flow of fluid 9, as is described in greater detail in U.S. Pat. No. 3,788,144 to Blackwell or U.S. Pat. No. 3,972,232 to Miller et al., which are incorporated by reference herein. It is envisioned that obstruction 16 can include any obstruction arrangement configured to generate vortices 20 or alternating vortices 20.

As illustrated, obstruction 16 is mounted in housing cavity 12. Illustratively, obstruction 16 may be molded with housing 10. In one illustrative embodiment, obstruction 16 may be molded as an integral part of housing 10. Obstruction 16 may also be injection molded during the definition of both obstruction 16 and sleeve 22 of housing 10. There are a vast number of materials that may be utilized in the creation of housing 10 and obstruction 16, such as several types of plastic, polymers, cross-linked polyethylene, polypropylene, high molecular weight polypropylene (HMWPE) and combinations thereof.

In an alternative embodiment, obstruction 16 is attached to housing 10 through any conventional fastening mechanism. Several mechanisms are available for mounting obstruction 16 to housing 10 and within housing cavity 12, such as threaded openings within the housing and corresponding threaded projections as part of obstruction 16.

As also illustrated in FIG. 1, flexible deflection sensor or membrane 18 is also located within housing cavity 12. In one embodiment, flexible deflection sensor 18 is directly mounted to obstruction 16. In an alternative embodiment, flexible deflection sensor 18 is mounted to housing 10. As also illustrated in FIG. 1, flexible deflection sensor 18 has a longitudinal axis 28 that is substantially parallel to fluid flow 14 and illustratively coaxial with the longitudinal axis 11 of housing 10. As also illustrated in FIG. 1, flexible deflection sensor 18 is downstream of obstruction 16. It is envisioned that flexible deflection sensor 18 is relatively thin to provide the required resiliency. In one illustrative embodiment, flexible deflection sensor 18 is approximately 0.005 inches thick. Illustrative flexible sensors are described in U.S. Pat. No. 5,583,476 to Langford, the disclosure of which is expressly incorporated by reference herein, and are commercially available from Flexpoint Sensor Systems, Inc. of Draper, Utah.

In operation, when fluid flow 14 passes through housing cavity 12, obstruction 16 generates unsymmetrical alternating vortices 20 which cause alternating pressure distributions (illustratively defined as positioned on opposing sides of longitudinal axis 11) impacting flexible deflection sensor 18. Alternating vortices 20 exert force against opposing sides of flexible deflection sensor 18 causing flexible deflection sensor 18 to deflect or bend. Such deflection or bending is described as to force from a straight form into a curved or angular form. When first vortex 20a is shed, pressure distribution on flexible deflection sensor 18 changes. As described in greater detail below, alternating vortices 20a, 20b, 20c apply force to flexible deflection sensor 18 changing flexible deflection sensor 18 from a straight form into a curved arrangement. The shedding of alternating vortices 20 can create periodic lateral forces on flexible deflection sensor 18. It is envisioned that flexible deflection sensor 18 is thin enough that periodic lateral forces caused by alternating vortices 20 cause flexible deflection sensor 18 to bend as described above.

As previously stated, per obstruction 16, there is a relationship between the frequency of vortex shedding (as evidenced by the frequency of alternating vortices 20) and the speed of fluid flow 14. In other words, the velocity of fluid flow 14 can be derived from sensing the frequency of alternating vortices 20. As described in greater detail below, flexible deflection sensor 18 is configured to sense the bending, the frequency of the bending, and the amplitude of the bending caused by vortices 20.

Figure 2:
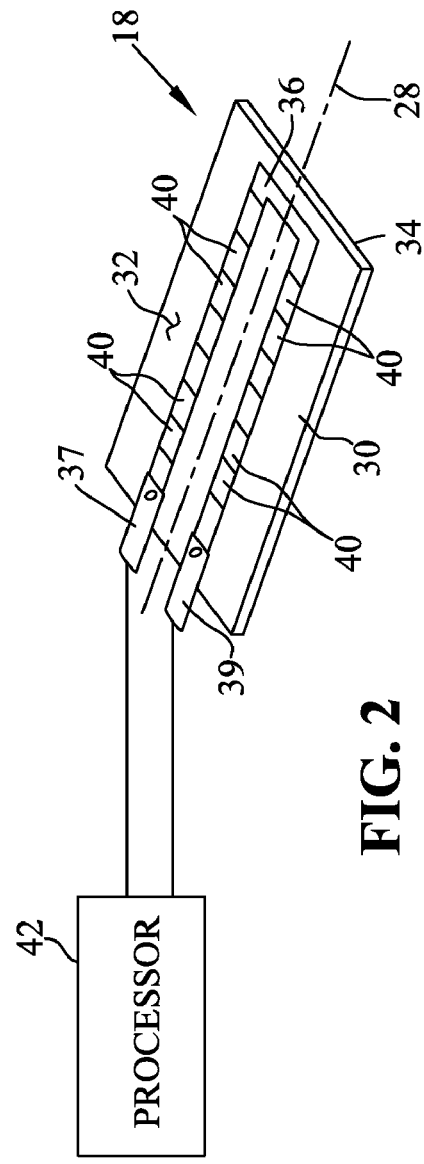
FIG. 2 is a perspective view, in partial schematic, of the flexible deflection sensor of FIG. 1.
Figure 3:
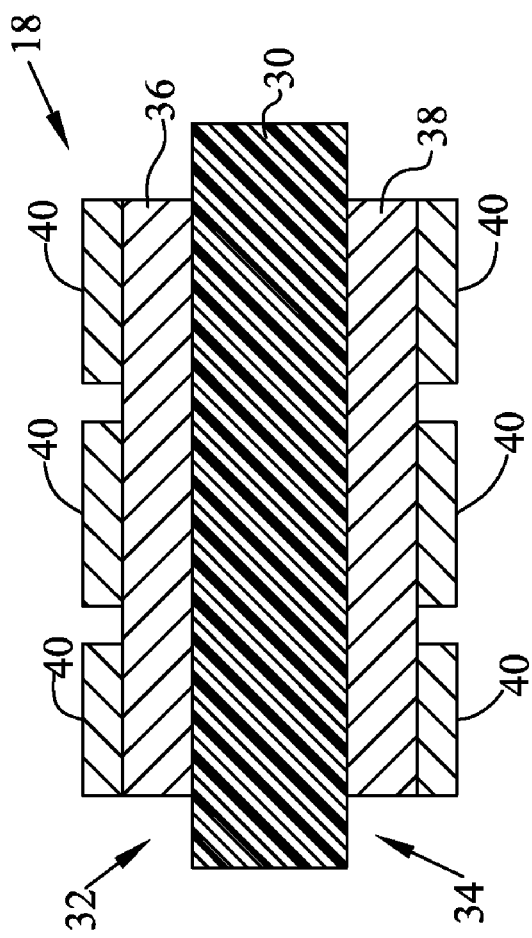
FIG. 3 is a cross sectional view of the flexible deflection sensor of FIG. 1.

Now referring to FIGS. 2 and 3, flexible deflection sensor 18 includes flexible electrically insulating substrate 30. Substrate 30 may be constructed of various materials, including various polymers such as polyamide, polyimide, and polyester, which may be a thermoplastic or a thermoset. Various types of phenolic resin materials are presently believed to be suitable as substrate 30. Substrate 30 has first or upper side 32, illustrated as top surface 32. Substrate 30 has second or lower side 34, illustrated as bottom surface 34. A layer of electrically conductive material 36 is applied to top surface 32 of substrate 30. Similarly, a second layer of electrically conductive material 38 is applied to bottom surface 34 of substrate 30. As illustrated, the arrangement of bottom surface 34 of substrate 30 is essentially a mirror image of the arrangement of top surface 32.

Conductive materials 36 and 38 may illustratively be a two-part epoxy material, a thermoset adhesive, or a thermoplastic, and may each incorporate variable resistive materials such as graphite, carbon, and/or conductive ink. The variable resistive material may be used as a wetting, a gluing, a sticking, or an adhesive material. More particularly, the variable resistive material may include a carbon ruthenium to attach conductive materials 36 and 38 to substrate 30. Furthermore, conductive materials 36 and 38, including variable resistant materials such as graphite, may be used in combination with a binder. In one illustrative embodiment, the conductive materials 36 and 38 comprises a conductive ink including graphite in combination with a binder.

As previously stated, flexible deflection sensor 18 is configured to bend. Conductive materials 36 and 38 experience varying electrical properties in response to bending of the underlying substrate 30. In one illustrative embodiment, it is believed that the conductive ink containing graphite of materials 36 and 38 cracks or deforms as it is deflected or bent. As the conductive ink bends, the number of cracks and spaces therebetween is believed to increase, thereby predictably changing the electrical resistance. This change in resistance may be measured by the application of electrical signals.

More particularly, electronic measurements are made by running electric current through conductive materials 36 and/or 38. More particularly, electrical connectors 37 and 39 may electrically couple each of the conductive materials 36 and 38 to a controller or processor 42 (FIG. 2). Electronic measurements made by the processor 42 may be used to measure the degree of bend or angle of deflection or flexing of conductive materials 36 and/or 38. The greater the bend, the greater the resistance of electronic current through conductive material 36 and/or 38 between respective connectors 37 and 39. As is known, resistance is described as electrical impedance or Ohm value. Through electronic measurements a relationship exists between the degree or angle of deflection of flexible deflection sensor 18 and the resistance of conductive materials 36 and/or 38. The amplitude of the periodic lateral forces of alternating vortices 20 causes an increased degree of deflection of flexible deflection sensor 18. Electronic measurements based on the bend of flexible deflection sensor 18 can be analyzed and used in software stored within processor 42 to determine both the frequency of alternating vortices 20 and the amplitude of the periodic lateral forces on flexible deflection sensor 18 caused by alternating vortices 20.

Flexible deflection sensor 18 may also include segment conductors 40 attached to conductive materials 36 and/or 38. Segment conductors 40 may be made of silver, silver alloys, or other electrically conductive materials, such as conductive carbon-based compounds. The conductivity of segment conductors 40 remains essentially constant upon deflection. Therefore, segment conductors 40 provide electrical paths for electrical current that are in parallel with the electrical path provided by conductive materials 36 and 38. Segment conductors 40 act as attenuators and reduce the overall resistance of conductive materials 36 and 38. Illustratively, the segment conductors 40 may make the resistance versus degree of deflection more linear. Furthermore, segment conductors 40 may cause resistance to be more consistently repetitive at a particular deflection configuration.

Figure 4:
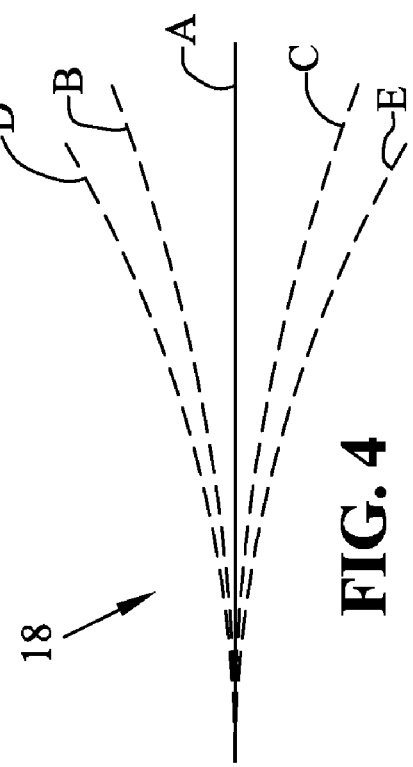
FIG. 4 is a side view of the flexible deflection sensor of FIG. 1 in various degrees of deflection.

As shown in FIG. 4, flexible deflection sensor 18 is shown in several configurations. Flexible deflection sensor 18 is shown in non-deflective configuration A, also described as static configuration, straight form configuration, and/or first position. Configuration A also defines a negligible amount of bending of flexible deflection sensor 18. Alternatively, flexible deflection sensor 18 is shown in bent configuration B, also described as second position and/or a non-negligible amount of bending. Bent configuration B corresponds with lateral force placed against flexible deflection sensor 18 to move flexible deflection sensor 18 away from non-deflective, static configuration A. Flexible deflection sensor 18 is alternatively shown in bent configuration C which is in the opposite lateral direction from bent configuration B. Flexible deflection sensor 18 is also alternatively shown in bent configuration D, which is in the same lateral direction as bent configuration B. However, bent configuration D reflects a greater degree of deflection than bent configuration B. Similarly, flexible deflection sensor 18 is also alternatively shown in bent configuration E, which is in the same lateral direction as bent configuration C. However, bent configuration E reflects a greater degree of deflection than bent configuration C. In operation, the resistance of conductive materials 36 and 38 changes predictably when flexible deflection sensor 18 deflects in a first direction (i.e. bent configuration B) due to lateral forces by, for example, first vortex 20a.

Generally speaking, configuration A is a static position that is substantially flat or straight. Static configuration A substantially is parallel to fluid flow 14 along longitudinal axis 11. As illustrated in FIG. 1 static configuration A is described as the longitudinal axis of the length of flexible deflection sensor 18 extending downstream of fluid flow 14. For example, flexible deflection sensor 18 has a predictable and repeatable resistance $R_A$ at configuration A. Flexible deflection sensor 18 has a predictable and repeatable resistance $R_B$ at configuration B. Resistance $R_B$ is substantially greater than resistance $R_A$. The change from configuration A to configuration B is measurable, predictable, and repeatable. Electronic measurement of the change of resistance of conductive materials 36 and 38 reflects the degree of deflection (i.e., whether flexible deflection sensor 18 is in bent configuration B, bent configuration D, some configuration between bent configurations B and D, or greater than bent configuration D).

Similarly, the resistance of conductive materials 36 and 38 predictably changes when flexible deflection sensor 18 deflects in a second direction (i.e. bent configuration C) due to second vortex 20b or combination of alternating vortices 20a, 20b, 20c. At configuration C, flexible deflection sensor 18 has a predictable and repeatable resistance $R_C$, which is substantially greater than resistance $R_A$ and which is distinguishable from resistance $R_B$. Electronic measurement of the change of resistance of the conductive material reflects the amount of deflection (i.e., whether flexible deflection sensor 18 is in bent configuration C, bent configuration E, some configuration between bent configurations C and E, or greater than bent configuration E). The change from configuration A or configuration B to configuration C is measurable, predictable, and repeatable. Electronic measurement of the second change of resistance also reflects the frequency of alternating vortices 20. As previously stated, per obstruction 16, there is a relationship between the frequency of vortex shedding (as evidenced by the frequency of alternating vortices 20) and the speed of fluid flow 14.

The electrical resistance of flexible deflection sensor 18 predictably varies as conductive materials 36 and 38 are bent or deflected incrementally to any configuration between configurations A, B, C, D, and E as well as other configurations involving greater bending or deflection. The resultant electrical measurements can be compared to a predefined map of applicable flow characteristics to determine the speed of fluid flow 14 by measuring the frequency of alternating vortices 20.

In certain illustrative embodiments, the degree of elasticity of the flexible deflection sensor 18, possibly substrate 30, may vary in relation to the temperature of the fluid 9. Furthermore, it is envisioned that flexible deflection sensor 18, including substrate 30, has a glass transition temperature generally below a range of approximate temperatures of the fluid 9. Substrate 30 may include a linear temperature dependent material. More particularly, the degree of bending of deflection sensor 18 may be effected by the thermal characteristics of the deflection sensor material, and allow for more bending as the fluid temperature increases making the deflection sensor 18 less rigid and easier to bend. Inversely, as the temperature of the fluid 9 decreases, the flexible deflection sensor will become more rigid, and harder to bend.

Figure 5A:
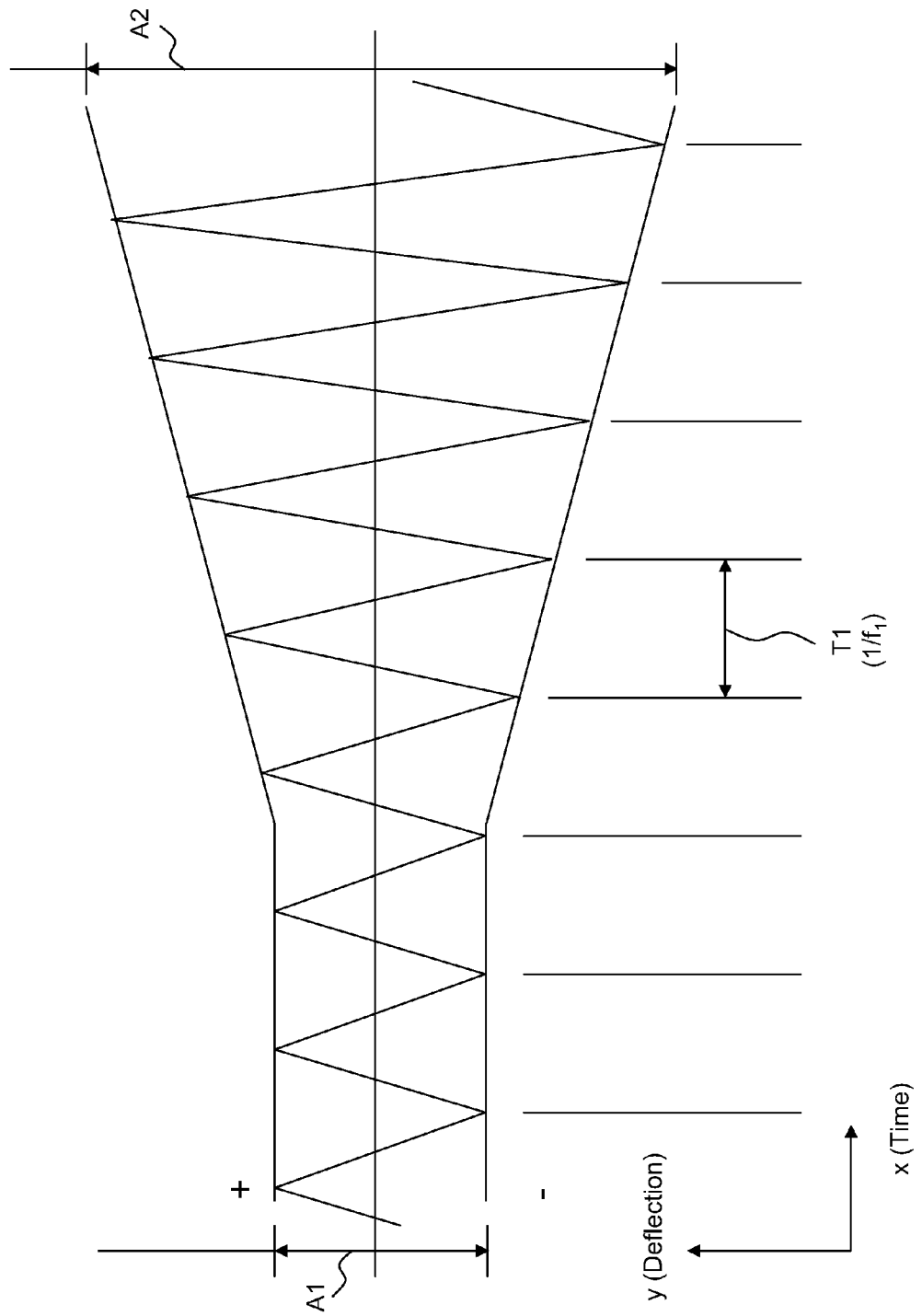
FIG. 5A is a schematic representation of illustrative deflections measured by the flexible deflection sensor of FIG. 1.
Figure 5B:
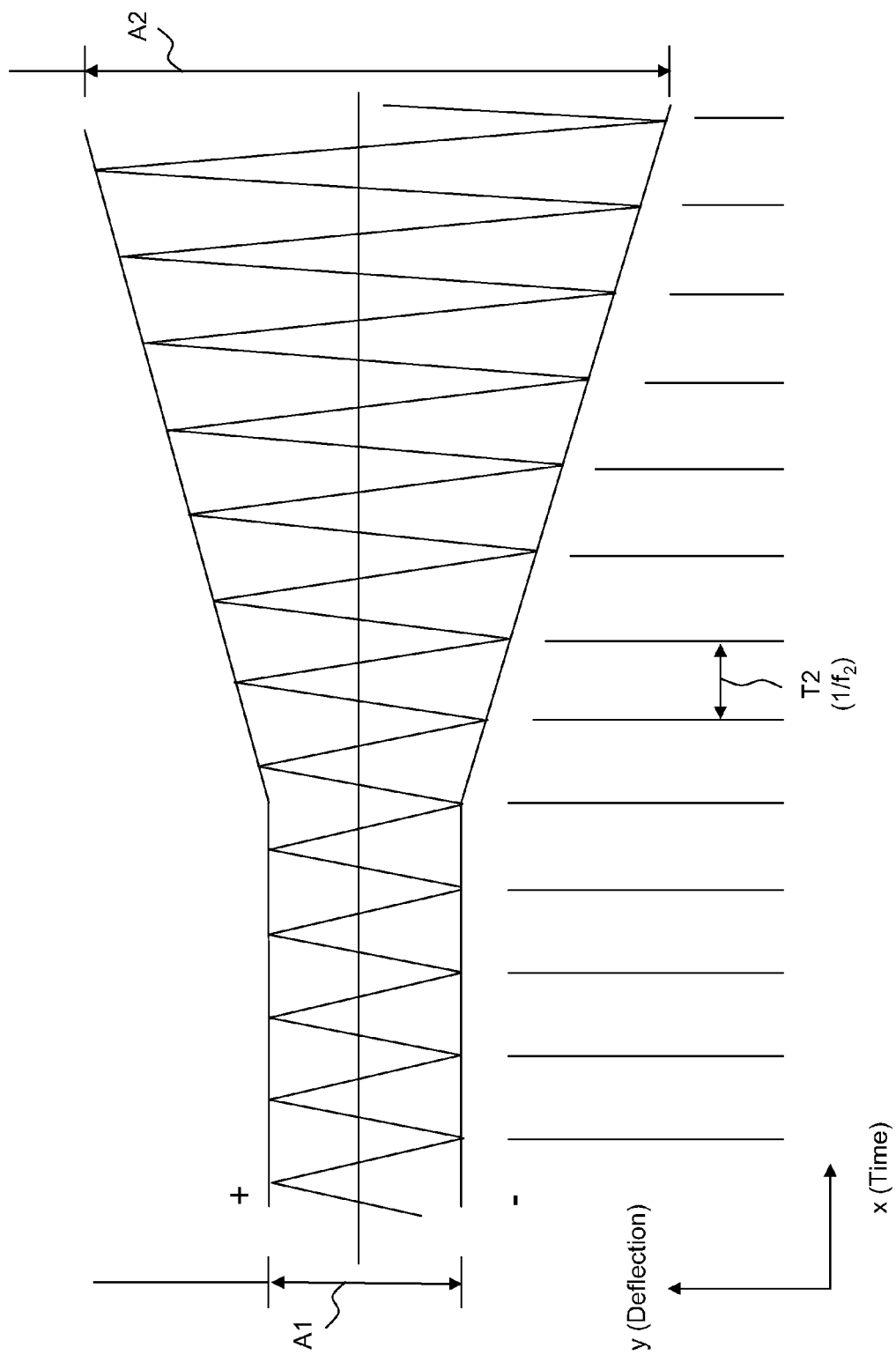
FIG. 5B is a schematic representation of further illustrative deflections measured by the flexible deflection sensor of FIG. 1.

FIGS. 5A and 5B are schematic representations of illustrative deflections measured by flexible deflection sensor 18 and analyzed by processor 42, where the x-axis represents time and the y-axis represents the amount of deflection. While the deflection waveforms in FIGS. 5A and 5B are shown as being generally sawtooth patterns, it should be appreciated that other waveforms may be substituted therefor, such as sinusoidal patterns. FIG. 5A illustrates bending of the sensor 18 with a constant frequency f and a varying amplitude A. As is known, frequency f is defined as the number of cycles, or periods, per unit time (i.e., T=1/f, where T is the period and f is the frequency), while amplitude A is known as the magnitude of change in an oscillating variable. As such, in the illustrative embodiments, frequency f is the number of deflection cycles per unit time, while amplitude A is the magnitude of the deflections. In other words, frequency f is representative of fluid flow rate, while amplitude A is representative of fluid temperature.

While the period T1, and hence the frequency f1, is constant in FIG. 5A, in other illustrative embodiments the frequency f could vary, thereby representing a change in flow rate. In other words, a changing frequency f represents a changing vortex shedding rate and hence a changing fluid flow rate. The amplitude A of deflection of sensor 18 in FIG. 5A varies from A1 to A2. Amplitude A1 represents a relatively low fluid temperature based upon relatively little deflection of sensor 18 and a corresponding low resistance analyzed by processor 42 (as illustrated by deflections B and C in FIG. 4), while amplitude A2 represents a relatively high deflection of sensor 18 and a corresponding high resistance analyzed by processor 42 (as illustrated by deflections D and E in FIG. 4).

FIG. 5B is a schematic representation similar to FIG. 5A, but with a different cycle period T2, and hence frequency f2 of deflection. More particularly, while the amplitudes A1 and A2 of deflection are similar (i.e., similar fluid temperatures), frequency f2 is greater than frequency f1. More particularly, frequency f2 is constant and represents a greater flow rate than represented by frequency f1 in FIG. 5A.

In certain illustrative embodiments, the resultant electrical measurements may be compared by processor 42 to a predefined map of applicable flow and temperature characteristics to determine the temperature of fluid 9 by measuring the amplitude A (magnitude of bend or deflection of flexible deflection sensor 18) caused by alternating vortices 20.

Although the invention has been described in detail with reference to certain preferred embodiments, variations and modifications exist within the spirit and scope of the invention as described and defined in the following claims.

The invention claimed is:

1. A vortex sensor for detecting the flow volume of a fluid, the vortex sensor comprising:
    a housing defining a housing cavity for the fluid to flow;
    an obstruction supported by the housing, the obstruction mounted in the housing cavity, the obstruction perpendicular to the flow of the fluid and including a plurality of side edges configured to generate alternating vortices in the fluid; and
    a flexible deflection sensor supported by the obstruction, the flexible deflection sensor having a longitudinal axis downstream of the obstruction, the flexible deflection sensor configured to be located between the alternating vortices in the fluid, the flexible deflection sensor including:
        a flexible insulating substrate, and
        a conductive material applied to the flexible insulating substrate, the conductive material having an electrical resistance which varies as the conductive material is bent.

2. The vortex sensor of claim 1, wherein the housing is a tube.

3. The vortex sensor of claim 1, wherein the housing defines a generally cylindrical shape.

4. The vortex sensor of claim 3, further comprising at least one sleeve coupled to the housing, the at least one sleeve including a sleeve cavity of lesser diameter than the housing cavity.

5. The vortex sensor of claim 1, wherein the housing includes end caps configured to couple the housing to pipeline connections.

6. The vortex sensor of claim 1, wherein at least one of the plurality of side edges is radially outward relative to the flexible deflection sensor.

7. The vortex sensor of claim 1, wherein at least one of the plurality of side edges is configured to cleanly shed the alternating vortices in the fluid.

8. The vortex sensor of claim 1, wherein the obstruction includes a plate including a flat surface, the flat surface having a longitudinal axis perpendicular to the flow of the fluid.

9. The vortex sensor of claim 8, wherein the plate includes at least one of the plurality of side edges.

10. The vortex sensor of claim 1, wherein the obstruction has a cylindrical cross section.

11. The vortex sensor of claim 1, wherein the obstruction is an integral part of the housing.

12. The vortex sensor of claim 1, wherein the flexible deflection sensor is generally rectangular in shape.

13. The vortex sensor of claim 1, wherein the conductive material is an ink.

14. A vortex sensor for detecting the flow volume of a fluid and for detecting the temperature of the fluid, the vortex sensor comprising:
    a housing defining a housing cavity for the fluid to flow;
    an obstruction supported by the housing, the obstruction mounted in the housing cavity, the obstruction perpendicular to the flow of the fluid, the obstruction including a plurality of side edges configured to generate alternating vortices in the fluid; and
    a flexible deflection sensor supported by the obstruction, the flexible deflection sensor having a longitudinal axis downstream of the obstruction and configured to be located between the alternating vortices in the fluid, the flexible deflection sensor including:
        a flexible insulating substrate, the flexible insulating substrate having a glass transition temperature generally below a range of approximate temperatures of the fluid, the flexible insulating substrate including a linear material, and a conductive material applied to the flexible insulating substrate, the conductive material having an electrical resistance which varies as the conductive material is bent.

15. The vortex sensor of claim 14, wherein the electrical resistance measures the frequency between the alternating vortices as a measure of the flow volume.

16. The vortex sensor of claim 14, wherein the electrical resistance measures a degree of elasticity of the flexible insulating substrate as a measure of the temperature of the fluid.

* * * * *